May 11, 1971  N. C. HEBERT ET AL  3,578,579
ELECTROCHEMICAL APPARATUS

Filed Sept. 11, 1967  2 Sheets-Sheet 2

ZONE-LEACHED GLASS TUBE

ALL POROUS GLASS TUBE

ALL POROUS GLASS TUBE PARTIALLY COATED WITH METHYL METHACRYLATE

GLASS TUBE WITH ATTACHED POROUS PLATE MEMBRANE

INVENTORS.
NORMAND C. HEBERT
MARTIN E. NORDBERG
BY
*Gerhard K. Adam*
ATTORNEY

United States Patent Office 3,578,579
Patented May 11, 1971

3,578,579
ELECTROCHEMICAL APPARATUS
Normand C. Hebert and Martin E. Nordberg, Corning,
N.Y., assignors to Corning Glass Works, Corning, N.Y.
Filed Sept. 11, 1967, Ser. No. 666,843
Int. Cl. G01n 27/36
U.S. Cl. 204—195
8 Claims

ABSTRACT OF THE DISCLOSURE

An electrochemical apparatus for determining the concentration of cations in solution and more particularly, an improved glass electrode for determining the activity of alkaline earth metal ions in an aqueous solution.

---

Electrochemical instruments are well known in analysical chemistry for furnishing rapid and accurate determinations of chemical constituents in solution. A commonly used laboratory instrument of this type is the pH meter which essentially is made up of a sensing electrode, a reference electrode, and a potentiometer. The two electrodes are simultaneously immersed into a test solution such that an electrochemical cell develops, the potential generated by the electrodes being approximately proportional to the logarithm of the reciprocal of the hydrogen ion concentration.

The most convenient and versatile of the hydrogen sensing electrodes is the "glass electrode," so called because it has a glass membrane at which the significant electropotential arises. Structurally, the glass electrode includes the elements of a glass tube or body, an internal reference electrode, a sensing membrane, and a liquid electrolyte contact between the membrane and the internal reference electrode. As a further development, it was found that glass electrodes sensitive to cations other than hydrogen, such as sodium and potassium, could be made in which the sensing portion is formed from special glass compositions. Significant work in this field was done by G. Eisenman et al. and described in United States Pats. No. 2,829,090 and No. 3,041,252. It is believed that the glass electrodes function by exchange of ions at the interface between the glass membrane and the solution under test. In solid glass, the mobility of ions having a valence charge more than one is greatly limited. Thus, because of the rigid and solid structure of conventional glass membranes, such electrodes are primarily sensitive only to monovalent ions.

It is therefore an object of the present invention to provide an electrode which is sensitive to divalent cations in an aqueous solution.

A further object of the present invention is to provide a method for selectively measuring the concentration of divalent cations in an aqueous solution.

In accordance with the present invention, we have discovered a glass electrode for measuring the activity of alkaline earth metal ions in aqueous solutions wherein the sensing portion of the electrode is comprised of a semipermeable porous glass membrane. These electrodes are sensitive to divalent cations even in the presence of monovalent cations. The selectivity towards divalent cations is such that total water hardness, due to the presence of calcium and magnesium compounds, but usually calculated to p.p.m. of calcium carbonate, can be determined with relatively little interference from other ions. Our novel electrodes can be used with conventional equipment and for an extended period of time without deleterious aging effects.

The invention is more clearly understood from the following description taken in conjunction with the accompanying drawing in which.

Figure 1:
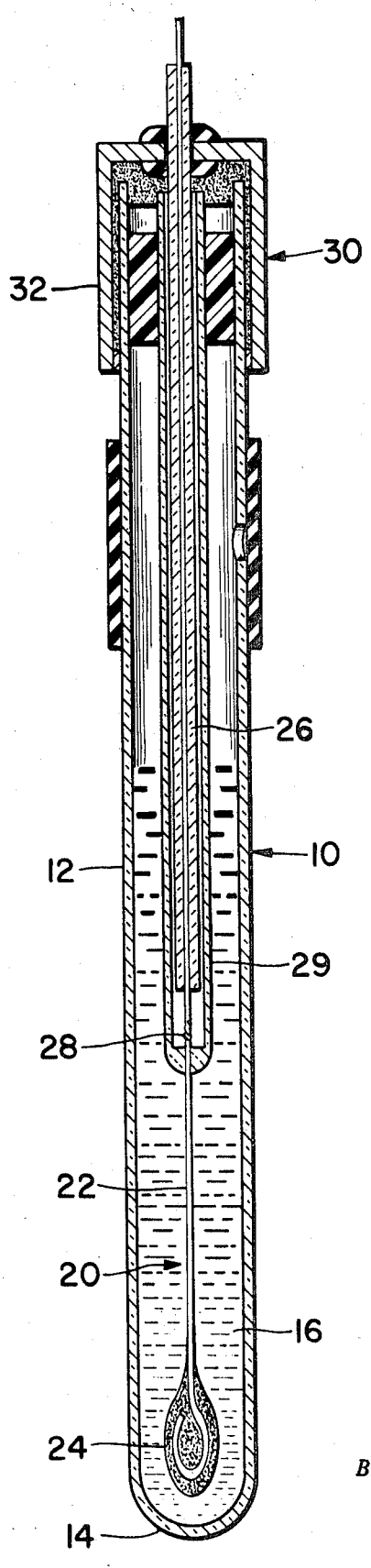
FIG. 1 is a cross-sectional view of a representative electrode formed according to the principles of the present invention.

Referring now to embodiment illustrated by FIG. 1, the glass electrode 10 of the present invention is comprised of an outer glass tube or body having an opening at one end. At the other end of the glass tube there is a semipermeable porous glass membrane 14 which may be an integral part of the glass tube 12 or may be attached thereto by a suitable means such as by a solder glass. The interior of the glass tube 12 is occupied by an electrolyte, such as a saturated aqueous solution of potassium chloride, which makes electrical contact between the porous glass membrane and a conventional internal reference electrode 20. Typically the internal reference electrode 20 is a platinum wire 22 having at its lower portion a silver/silver chloride coating 24. The platinum wire 22 is then attached to a shielded cable 26 by means of solder joint 28. There is an inner glass tube 29 which encapsulates the shielded cable 26. At the opening of the tube, designated as the upper end 30 of the electrode, there is placed a cap 32 which serves to seal off the electrode.

Figure 2:
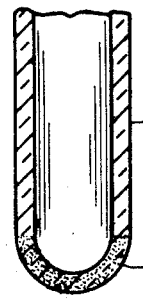
FIGS. 2–5 are cross-sectional views illustrating various configurations of the forms or attachments of the sensing portion to the body of the electrode.
Figure 3:
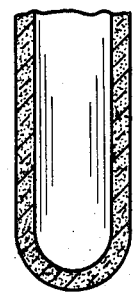
Figure 4:
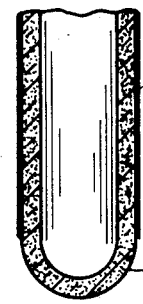
Figure 5:
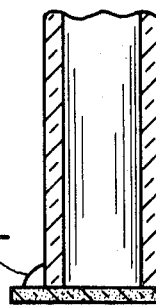

Various procedures exist for forming the semipermeable glass membrane on the body of the electrode. FIG. 2 illustrates the preferred type in which a special phase separating glass has been zone leached at a selective portion whereby only the lower end becomes porous. A modified electrode is illustrated by FIG. 3 in which the entire body of the electrode has been treated to make an all porous body. A still further modification is illustrated by FIG. 4 in which the electrode of FIG. 3 has been coated with a plastic material, e.g. methyl methacrylate, along the sides of the body such that only the bottom portion remains uncoated as the sensing membrane. A different approach to forming the electrode is illustrated by FIG. 5 wherein the porous glass membrane in the form of a disc or plate is attached by a seal, such as by use of a sealing glass or epoxy resin, to a glass stem which forms the body of the electrode. The other elements of the electrode are substantially the same as shown in FIG. 1.

The improvement in the glass electrode to which the present invention is directed concerns the structure and nature of the membrane separating the internal reference solution from the aqueous test solution. As shown in FIG. 1 and the accompanying description, the sensing portion is a semipermeable porous glass membrane, i.e. the membrane is to some extent permeable to monovalent and divalent cations. With a porous structure, the membrane is now able to spacially accept divalent ions which heretofore could not exchange on the surface of the solid glass membrane.

The porous glass membrane is characterized by a multiplicity of intercommunicating, submicroscopic pores throughout its mass. These pores are typically in the range of 20–50 A. in diameter. In forming a membrane of this type for sensing divalent cations, it is necessary that the membrane be substantially impermeable to anions. Thus the membrane is formed such that it has a negative surface charge. We have found for the present purposes that the membrane should have a negative charge density of at least greater than 0.02 normal. Additionally, an inherent property, related directly to the method of forming the membrane, is that the composition thereof contains greater than 90% by weight silica. Glasses of this type have been consolidated into high silica glasses, also conventionally known as "96% Silica Glasses" or Reconstructed Glasses.

The basic production procedure for making the porous glass membrane and a particularly suitable family of borosilicate glasses are described in U.S. 2,221,709 issued to Hood et al. Briefly the method includes (1) forming an article of the desired shape from a parent borosilicate glass; (2) thermally treating the glass article at a sufficient temperature e.g. 500–600° C. for a period of time to separate the glass into a silica-rich phase and a silica-poor phase; (3) dissolving or leaching the silica-poor phase, usually with acid, to produce a porous structure composed of the silica-rich phase; and (4) washing to remove the leaching residue, and drying. The above procedure illustrates how the porous glass membrane is formed without considering the mode of attachment to the electrode body. As illustrated in the drawing various configurations may be made. The electrode may be in the form of a completely porous tube, a modification thereof in which the upper portion is closed off by means of a plastic coating, the preferred embodiment in which the tube has been zone leached, or the membrane may be separately formed and then subsequently attached to the body of the electrode.

Zone leaching requires a little further consideration. Initially the entire glass tube is phase separated as described above. Immediately thereafter the upper portion of the tube is flashed fired at elevated temperatures to erase the phase separation, in that selected area. Then the glass is subjected to an acid leaching step and only the portion at the end which had remained phase-separated becomes porous.

The porous glass prepared as described above possesses a loose, open structure in which divalent cations can diffuse. It had previously been thought that because of the large pore diameter (up to 50 A.) these membranes could not be sensitive to divalent cations. The pore size being so much greater than the diameters of the cations one would merely expect simple liquid junction potentials. However, the pore diameters were determined in the dry state from adsorption isotherms. When the porous glass is placed in solution, the pore diameters are considerably reduced in size due to hydration and the actual pore diameters of 9–12 A. have been obtained from solvent permeability measurements. These latter values are in the same range as the diameters reported for hydrated cations (radii of hydrated $Mg^{++}$ and $Ca^{++}$ being found to be 4.28 and 4.12 respectively).

The electrode as illustrated by FIG. 1 is particularly effective in determining total water hardness. The hardness minerals are those which form insoluble curds with soap, i.e. calcium and magnesium compounds principally as bicarbonates, carbonates and sulfates. Hardness values are usually calculated to p.p.m. of calcium carbonate although all of the hardness does not occur in this form. While substantial variations occur in hard water the proportion of calcium is usually much greater than that of magnesium and is usually about 2-3 to 1. The electrode of the present invention is capable of determining water hardness as calcium carbonate in the range of about $10^{-1}$ to $10^{-5}$ molar. The presence of sodium or potassium ions in the water being tested as long as it is substantially less than the divalent metal cations will have an insignificant effect and generally can be disregarded. In most drinking water calcium and/or magnesium are present in at least $10^3$ times greater amounts than sodium and/or potassium. When, however, there are equal concentrations of alkaline earth metal and alkali metal ions, while the electrode has a preference for the alkaline earth metal ions, it is necessary to use a conventional sodium or potassium electrode to correct the error introduced by these contaminating ions.

Our invention is further illustrated by the following examples.

EXAMPLES

Electrode preparation consisted in making test tubes from tubing of a borosilicate glass followed by heat treatment. The starting glass composition is as follows:

TABLE I

Chemical analyses of glass tubing

| Constituent: | Weight percent (analysed) |
|---|---|
| $B_2O_3$ | 14.77 |
| $As_2O_3$ | 0.68 |
| PbO | 5.78 |
| $Al_2O_3$ | 1.31 |
| $SiO_2$ | 73.15 |
| $Na_2O$ | 3.57 |
| $Li_2O$ | 0.03 |
| $K_2O$ | 0.37 |
| Total | 99.66 |

In the case of the zone leached electrode, only the stem of the electrode was flamed to soften the glass and erase the heat treatment. The tip of the electrode (ca. ½" long) was protected from the flame with asbestos paper. The electrodes were then treated in a 10% $NH_4HF_2$ solution for 10 minutes, leached in acid, and placed in distilled water until ready to use.

Porous glass plates used in the fabrication of thin plate electrodes were prepared similarly. The glue used in gluing the plates onto the end of stems consisted of mixing Epi-Rez #510 with Epi-Cure #87 obtained from Jones-Dabney of Louisville, Ky.

The heat treatment to effect phase separation and the chemical analyses of the finished electrodes are reported in Table II.

TABLE II.—HISTORY AND CHEMICAL ANALYSES OF POROUS GLASS ELECTRODES [1]

| Electrode | Figure type | Heat treatment hours/° C./ cooling rate (° C./hour) | Percent $B_2O_3$ | $As_2O_3$ | PbO | $Al_2O_3$ | $Na_2O$ | $K_2O$ | $SiO_2$ by difference |
|---|---|---|---|---|---|---|---|---|---|
| A | 3 | 3/580°/80° | 4.41 | 0.29 | 0.50 | 0.57 | 0.23 | 0.21 | 93.79 |
| B | 4 | | | | | | | | |
| C | 4 | 3/580°/30° | 3.6 | 0.19 | 0.55 | 0.97 | | | 94.69 |
| D [2] | 2 | | | | | | | | |
| E | 3 | 3/600°/80° | 4.55 | 0.27 | 0.56 | 0.38 | 0.26 | 0.18 | 93.8 |
| F | 3 | 3/620°/80° | 4.75 | 0.20 | 0.64 | 0.41 | 0.34 | 0.26 | 93.4 |
| G | 2 | 3/580°/10° | 4.82 | 0.18 | 0.56 | 0.45 | 0.29 | 0.04 | 93.66 |
| H | 3 | 3/580°/30° | 4.65 | 0.14 | 0.56 | 0.50 | 0.24 | 0.04 | 93.87 |
| I | 3 | 3/580°/80° | 4.82 | 0.34 | 0.72 | 0.77 | 0.26 | 0.05 | 93.04 |
| J | 3 | 3/590°/30° | 4.89 | 0.27 | 0.60 | 0.45 | 0.29 | 0.04 | 93.46 |
| K [3] | 4 | 3/700°/10° | 5.49 | | | | 0.55 | | 93.96 |

[1] Chemical analyses were performed on consolidated glass samples. Electrodes analysed are in parentheses. Consolidation was accomplished by heating porous glass electrodes to 1,100° C.
[2] Electrode used to make determinations of Table III.
[3] Composition prior to leaching: 5 mole percent $Na_2O$, 15 mole percent $B_2O_3$ and 80 mole percent $SiO_2$.

The experimental set up used in the evaluation of electrodes consisted of a cell comprising a porous glass electrode and a saturated calomel electrode. The EMF across the cell was measured with a high impedance voltmeter (Corning Model 12 pH meter, Carry Vibrating Reed Electrometer Model 31CV, or a Keithly Model 610A Electrometer) with strip chart recorder (Leeds and Northrup Speedomax W). A magnetic stirrer was used for stirring solutions. All measurements were taken at 26±2° C.

A standard procedure of evaluating the response and selectively of electrodes was devised. This consisted in measuring electrode response to $MgCl_2$ and $CaCl_2$ over the concentration range of $10^{-1}$ to $10^{-5}$ M and again to $CaCl_2$ solutions ($10^{-1}$ to $10^{-5}$ M) containing $10^{-2}$ MNaCl and $10^{-2}$ M KCl. Selectivity constants, $K_{CaNa}$ and $k_{CaK}$, were obtained directly from these data. These, in combination with EMF values in single salt solutions allowed the approximate determination of $k_{MgCa}$, $k_{NaK}$, $k_{MgK}$ and $k_{MgNa}$.

As a result of preliminary investigations, sat'd potassium chloride was chosen as the internal reference solution in order to maintain a reference solution with constant concentration.

The response to changes in $Mg^{++}$ concentration for $MgCl_2$ solutions approached a theoretical Nernstain slope $$\left(\frac{RT}{2F}\ln 10 = 29.5 \text{ mv. at } 25°\right)$$

in dilute solutions. For Electrode D an optimum response of 29 mv./decade was observed over the concentration range of $10^{-3}$ M to $10^{-4}$ M $MgCl_2$.

Porous glass electrodes can be used for the determinations of divalent cations in the presence of monovalent cations provided the $Ca^{+2}/Na^+$ ($Mg^{+2}/Na^+$) concentration ratios are greater than approximately $\frac{1}{10}$. This selectivity limits the usefulness of porous glass electrodes to the measurement of $Ca^{++}$, $Mg^{++}$ or other divalent cations in dilute solutions of monovalent cations. The lack of selectivity between $Ca^{++}$ and $Mg^{++}$ makes it ideal for the determination of total hardness of water (i.e. $Mg^{++}+Ca^{++}$).

Three local waters were chemically analysed for total $Mg^{++}$, $Ca^{++}$ by titration with EDTA followed by analysis with the porous glass electrode designated Electrode D, which had been standardized in a pure $CaCl_2$ solution. The results are reported in Table III.

TABLE III.—DETERMINATION OF WATER HARDNESS USING A POROUS GLASS ELECTRODE

| | Hardness, p.p.m. $CaCO_3$ (EDTA)a | EMF (mv.) | Hardness (from EMF) p.p.m. $CaCO_3$ b | Percent error |
|---|---|---|---|---|
| Standard solutions | 97.3 | −99 | | |
| | 201 | −91.8 | | |
| | 401 | −84.3 | | |
| Keuka lake | 96.6 | −101 | 80 | 17.1% (2 mv.) |
| Seneca lake | 191.2 | −93.3 | 174 | 9% (0.9 mv.) |
| Corning drinking water | 211.5 | −92 | 195 | 7.8% (0.6 mv.) | a Total Ca+Mg reported as $CaCO_3$.
b Ionic $Ca^{++}$ and $Mg^{++}$ reported as $CaCO_3$.

The differences observed between the EDTA titrations and EMF measurements were mainly experimental. This can well be improved by maintaining a constant temperature, using standard solutions closer in composition to the unknown solutions. The error resulting from the change of the activity of $Ca^{++}$, $Mg^{++}$ due to presence of $Na^+$, $K^+$ was not ascertained. This error can be reduced by using standard solutions containing $Na^+$, $K^+$ in the approximate amount present in the solutions to be measured. The EMF response to changes in $Ca^{++}$ concentration for $CaCl_2$ solutions generally is identical to that for $MgCl_2$ solution. A 31 mv./decade response was observed between $10^{-3}$ and $10^{-4}$ M $CaCl_2$ solutions.

The term "charge density" as used herein is a value equal to the concentration of unit negative charges per liter of pore volume and may be expressed in the form of normality.

A more complete discussion and a procedure for the calculation of the charge density are set forth in a paper by T. Teorell, Progress in Biophysics, 3, 305–369 (1953).

We claim:
1. A glass electrode for measuring the activity of alkaline earth metal ions in an aqueous solution and comprising
   (a) a hollow tube having an opening at one end,
   (b) a semipermeable porous glass, cation-sensitive membrane disposed across said opening,
   (c) an internal reference electrode, and
   (d) an electrolyte solution for making electrical contact between the membrane and the internal reference electrode, said membrane being characterized by a multiplicity of intercommunicating, submicroscopic pores having a pore diameter in the range of about 20–50 A. in the dry state, a negative charge density of greater than 0.02 normal, and a glass composition containing greater than 90% by weight silica.
2. The electrode of claim 1, wherein said glass composition consists essentially on the oxide basis of the following:

| Oxide: | Weight percent |
|---|---|
| Silica | 93–95 |
| Boric oxide | 3.5–5.5 |
| Alumina | 0–1.0 |
| Lead oxide | 0–1.0 |

3. The electrode of claim 1, wherein said membrane is attached to a nonporous glass tube being an integral part thereof, said tube forming the body of the electrode.
4. The electrode of claim 1, said membrane is in the form of a glass tube and the entire tubular body of the electrode has a porous structure.
5. The electrode of claim 4, wherein the sides of the tubular body are coated with a plastic material such that only the bottom portion of the electrode remains uncoated as the sensing membrane.
6. The electrode of claim 1, wherein the membrane is attached by a seal to a glass stem which forms the body of the electrode.
7. The electrode of claim 6, wherein said seal is by means of a sealing glass.
8. The electrode of claim 6, wherein said seal is by means of an epoxy resin.

References Cited
UNITED STATES PATENTS

| 2,221,709 | 11/1940 | Hood et al. | 106—54 |
| 2,366,489 | 1/1945 | Cary et al. | 204—195.1 |
| 3,224,433 | 12/1965 | Hroch von Dalebor | 204—195 |
| 3,305,468 | 2/1967 | Liesch | 204—195 |
| 3,338,812 | 8/1967 | Dworak et al. | 204—195 |
| 3,415,731 | 12/1968 | Carter | 204—195.1 |
| 3,448,032 | 6/1969 | Settzo et al. | 204—195 |

TA-HSUNG TUNG, Primary Examiner